United States Patent [19]

Azkona-Ollacarizqueta

[11] Patent Number: 5,203,874
[45] Date of Patent: Apr. 20, 1993

[54] DEVICE FOR SECURING DIES ON THREADING MACHINES

[75] Inventor: Manuel Azkona-Ollacarizqueta, Abadiano, Spain

[73] Assignee: Super-Ego Tools, S.A., Spain

[21] Appl. No.: 856,451

[22] Filed: Mar. 24, 1992

[51] Int. Cl.$^5$ .............................................. B21H 3/02
[52] U.S. Cl. ..................................... 470/82; 470/207; 470/83; 279/138
[58] Field of Search ................. 279/136, 138; 403/325, 403/321, 383; 470/82, 83, 207; 408/239 R, 240, 239 A, 714

[56] References Cited

U.S. PATENT DOCUMENTS

| | | | |
|---|---|---|---|
| 1,050,802 | 1/1913 | Bryant et al. | 470/83 |
| 2,087,084 | 7/1937 | Cote | 470/83 |
| 2,762,629 | 9/1956 | Dalby | 279/138 |
| 3,579,688 | 5/1971 | Keltz et al. | 408/239 |
| 4,025,210 | 5/1977 | Johnson | 403/383 |

FOREIGN PATENT DOCUMENTS

| | | | |
|---|---|---|---|
| 3900797 | 11/1989 | Fed. Rep. of Germany | 403/383 |
| 1130050 | 1/1957 | France | 279/136 |
| 2125719 | 3/1984 | United Kingdom | 470/82 |

Primary Examiner—Lowell A. Larson
Assistant Examiner—Michael J. McKeon
Attorney, Agent, or Firm—Lucas & Just

[57] ABSTRACT

The device uses a diaphragm cover between the adapter and the die to lock the die into the adapter. The cover is rotatably mounted onto the adapter and has a polygonal bore that matches the polygonal bore of the adapter. The mandrel of the die has a throat in which the cover sits when the cover is in the locked position. The cover is biased with a spring into the locked position. Stops are provided to limit the movement of the cover between the open and closed positions.

5 Claims, 2 Drawing Sheets

DEVICE FOR SECURING DIES ON THREADING MACHINES

This invention relates to threading machines and more particularly to a device for securing a die to a threading machine to prevent involuntary separation of the die from the threading machine.

Conventionally, manual tools, to include threading machines, are made so that there is one base body, and that base body is capable of being adapted to facilitate different tools which are of different dimensions. In the case of threading machines, the base body of the threading machine is generally made so that it can be adapted to accept threading dies or dies of different dimensions.

In order to facilitate different tools it is general practice to have both the base body and the tool with similar but oppositely configured mating sections. For example, the base body of the machine will have a bore therein which is hexagonal in shape while the tool will have a mandrel which is also hexagonal in shape so as to mate with the hexagonal bore in the base body. Often, an adapter is used to effect the conjugate mating between the tool and the base body. In order to secure the tool to the base body or the adapter, it is common practice to merely tighten the tool into the base body without any additional security device.

A problem associated with the conjugate mating of a base body and a tool or a tool to an adapter is the involuntary separation of the tool from the base body and/or adapter. The general practice of merely tightening one to the other does not provide adequate security in most cases.

The present invention is a device for securing the die onto a threading machine, the adapter onto the threading machine, or the die onto the adapter, to prevent the involuntary separation of one from the other. The device of the present invention is especially suited for securing the die to the adapter; however, the device of the present invention can also be used between the threading machine and the adapter as well as used between both the machine and the adapter and the adapter and the die.

Broadly, the device of the present invention, for use between the adapter and the die wherein the adapter has a polygonal bore in which the mandrel of the threaded die conjugately fits, comprises:

(a) a rotatable diaphragm cover coaxially mounted at one end of said adapter, said diaphragm cover having a polygonal bore therein, said polygonal bore being coaxial with said polygonal bore of said adapter, said polygonal bore of said cover having dimensions substantially identical to said polygonal bore of said adapter, said cover being rotatable between a closed position wherein said mandrel of said die is held in said adapter and an open position wherein said mandrel of said die can be inserted into or removed from said adapter (b) said mandrel of said die having a throat to accommodate said cover when said cover is in a closed position; and (c) spring means biased to maintain said cover in said closed position, said spring means connected at one end to said adapter and at the other end to said cover.

The device further comprises stop means to limit the rotation of the cover between the open and the closed position. Such stop means prevents excess wear on the spring means and insures proper alignment of the polygonal bore of the cover and the polygonal bore of the adapter when the cover is in the open position thereby facilitating insertion and removal of the mandrel of the die.

Suitable spring means for use in accordance with the present invention are compression springs and tension springs such as helical compression springs, helical tension springs, elastomeric coated compression springs and elastomeric coated tension springs.

In one embodiment of the present invention, the cover is housed in the adapter and the adapter contains a channel in front and on the circumference, in which the spring means is mounted. Rotation stops are arranged between the adapter and the diaphragm cover, which delimit the rotational movement of the cover and angularly indicate the unlocking position.

In another embodiment of the present invention, the diaphragm cover is mounted on the adapter at the front periphery thereof and the cover and the adapter have a series of conjugate stops/teeth. These stops/teeth hold the spring in place and limit the rotation of the diaphragm cover between the open and closed positions.

Preferably, a nut is placed at the end of the adapter opposite the end wherein the device of the present invention is attached to the adapter to prevent the adapter from separating from the threading machine.

These and other aspects of the invention may be more fully understood by reference to the accompanying drawings wherein.

Figure 1:
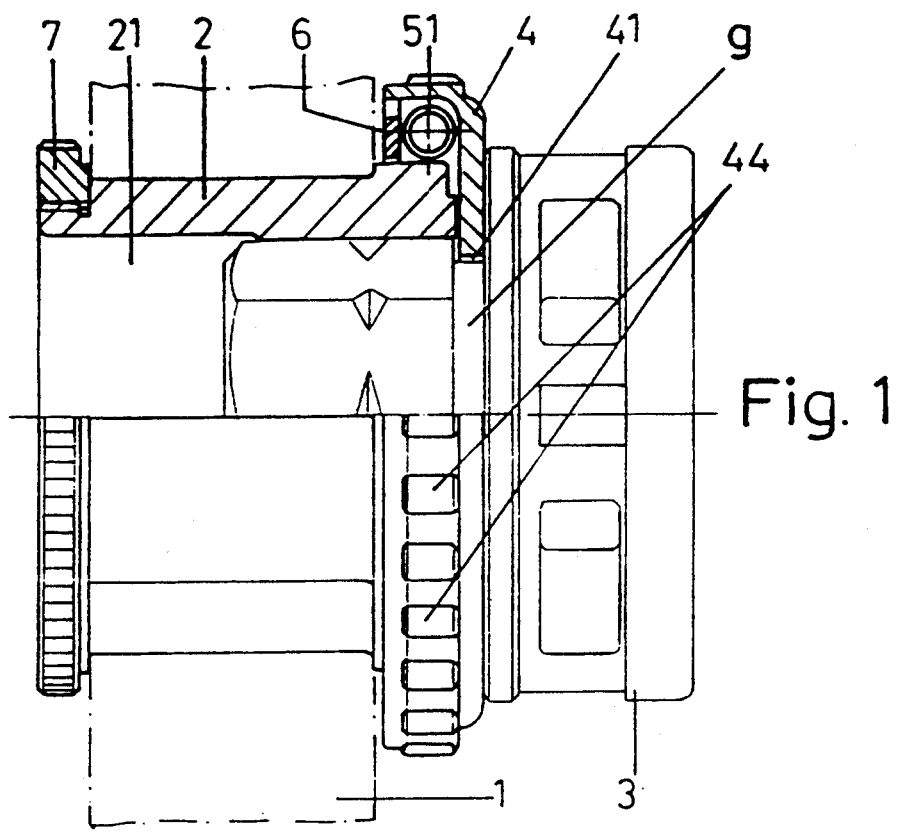
FIG. 1 illustrates a schematic view of the device according to the present invention wherein the cover is mounted on the adapter.

FIG. 1 illustrates threading machine 1 in dotted and dashed lines. In threading machine 1, adapter 2 has been inserted, and die 3 is shown with its mandrel inserted into adapter 2. Diaphragm cover 4 is positioned between adapter 2 and die 3. Helical compression spring 51 is positioned between cover 4 and ring 6. Nut 7 fastens adapter 2 onto threading machine 1.

Figure 2:
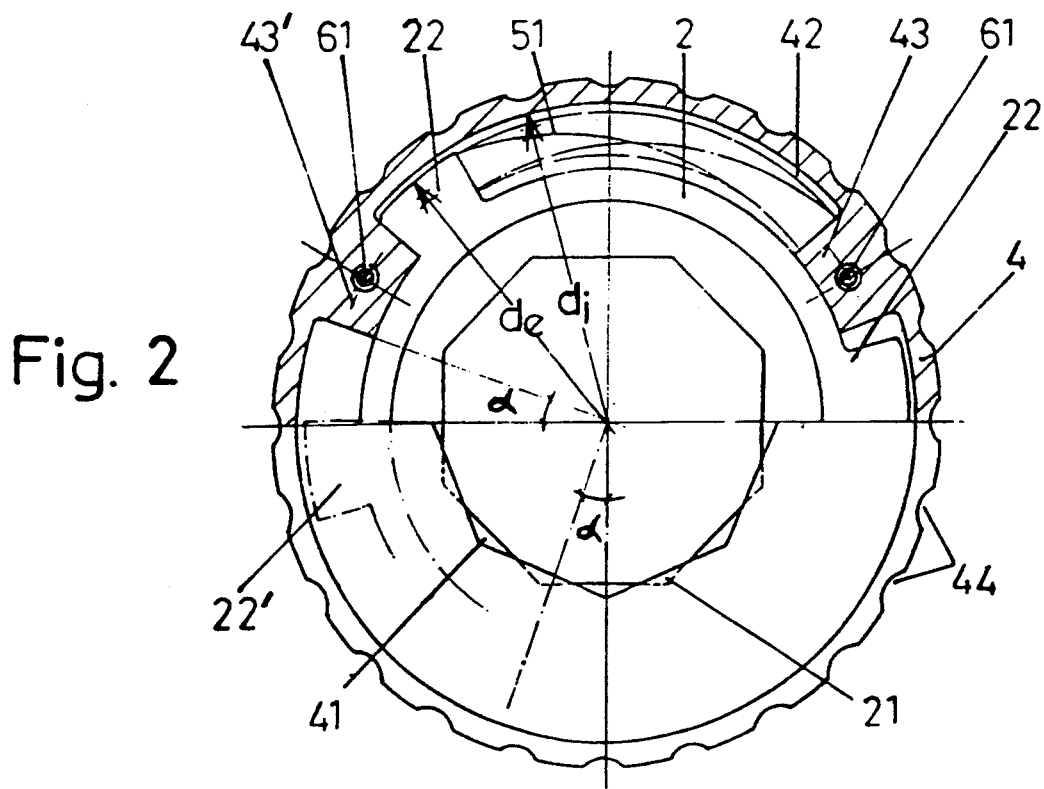
FIG. 2 illustrates a front schematic view of the device of FIG. 1.

As shown in FIG. 2, adapter 2 has polygonal bore 21 therein while cover 4 has polygonal bore 41 therein. FIG. 2 illustrates cover 4 in the closed position. Polygonal bore 41 is concentric with and of substantially the same dimensions as polygonal bore 21, such that when polygonal bore 21 is aligned with polygonal bore 41, the mandrel of die 3 can be inserted or removed from adapter 2. In addition to said bore 41, cover 4 has a plurality of arc-shaped channels 42, delimited by teeth 43.

Diaphragm cover 4 is positioned in front of adapter 2 and is held together longitudinally by ring 6 fastened to the diaphragm cover 4 by screws 61.

Adapter 2 has at one end and on the perimeter a plurality of stops 22 which fit between teeth 43. The outer diameter (de) of stops 22 approximately matches the inner diameter (di) of channels 42 so that cover 4 can rotate in relation to adapter 2. This rotation is limited by the conjugate positioning of stops 22 and teeth 43.

Figure 4:
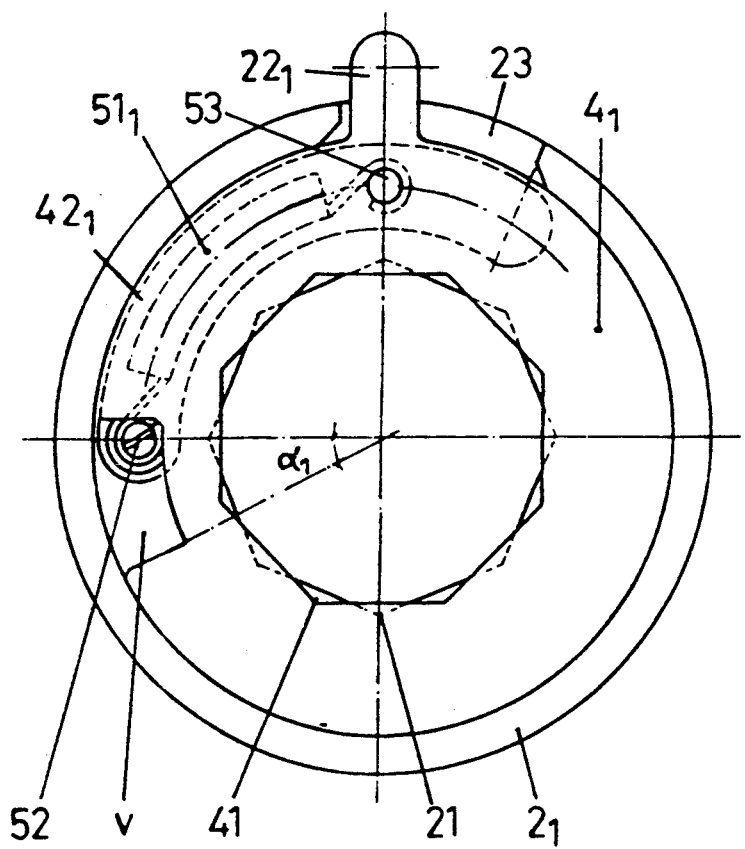
FIG. 4 illustrates a front schematic view of the device of FIG. 3.

Compression spring 51 housed in channel 42 biases cover 4 in a locking position. In the locked position as shown in FIG. 2 and FIG. 4, polygonal axial bore 41 is angularly out of phase with polygonal axial bore 21 of adapter 2. This difference in phase constitutes the anchoring traction means by which die 3 is securely held onto adapter 2 while cover 4 is in the closed position.

To align both axial bores 21 and 41, it is sufficient to turn diaphragm cover 4, thereby driving cover 4 into rotation in order to overcome the resistance offered by spring 51. When both axial bores 21 and 41 and aligned, the cover is in the open or unlocked position and the mandrel of die 3 can be inserted or removed from adapter 2.

In the embodiment in FIGS. 1 and 2, this rotary action is facilitated by shapes 44, which can be notches, dentation, milling or the like, and are positioned on the outer perimeter of diaphragm cover 4.

In closed position (FIG. 2), phase angle ($\alpha$) is created between adapter 2 and cover 4 and the walls of diaphragm cover 4 are locked in narrow throat g of the mandrel of die 3. This prevents the release of die 3 from adapter 2 and ultimately from threading machine 1. To attain the open position, that is, for the polygonal bores 21 and 41 to match, an $\alpha$ value phase displacement is effected between the walls of the stop 22' and tooth 43' so that, when they abut, the open or unlocked position is achieved.

Figure 3:
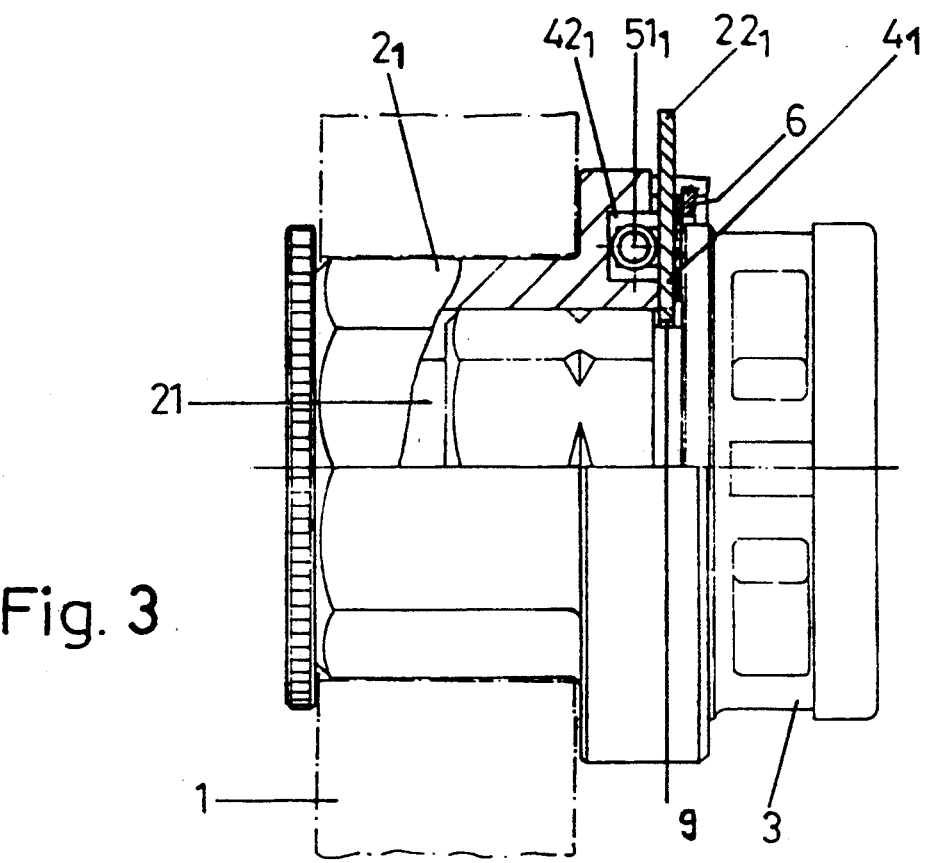
FIG. 3 illustrates a schematic view of the device of the present invention wherein the cover is housed in the adapter.

In FIGS. 3 and 4 an embodiment is represented in which adapter $2_1$ houses diaphragm cover $4_1$.

Arc-shaped channel $42_1$ has been machined in adapter $2_1$. Tension spring $51_1$ is placed in channel $42_1$ and joined at one end 52 to adapter $2_1$ and at the other end 53 to diaphragm cover $4_1$.

Diaphragm cover $4_1$ has tongue $22_1$ that projects out and can be displaced in groove 23 of adapter $2_1$ to facilitate opening of cover 4.

The open position is indicated by angle $\alpha_1$ of window V. Abutment of the wall of said window V with the end 52 denotes an open position. The open position is also indicated by the arc or groove 23 since arc or groove 23 and angle $\alpha$ constitute substantially the same angular movement.

The springs 51 and $51_1$ must be joined to the diaphragm covers 4 and $4_1$, respectively and to adapter 2 and $2_1$, respectively. Although the embodiment shown in FIGS. 1 and 2 uses a compressing spring and the embodiment in FIGS. 3 and 4 uses a tension spring, the two can be reversed such that the embodiment in FIGS. 1 and 2 uses a tension spring and the embodiment in FIGS. 3 and 4 uses a compression spring.

It will be understood that the claims are intended to cover all changes and modifications of the preferred embodiments of the invention herein chosen for the purpose of illustration which do not constitute a departure from the spirit and scope of the invention.

What is claimed is:

1. A device for securing a threaded die to an adapter of a threading machine wherein the adapter has a polygonal bore and said die has a polygonally shaped mandrel such that the polygonal bore of said adapter mates with the polygonally shaped mandrel of said die, said die having a throat which has a diameter smaller than the diameter of the mandrel, said device comprising:

(a) a rotatable diaphragm cover coaxially mounted at one end of said adapter, said diaphragm cover having a polygonal bore therein, said polygonal bore being coaxial with said polygonal bore of said adapter, said polygonal bore of said cover having dimensions substantially identical to said polygonal bore of said adapter, said cover being rotatable between a closed position wherein said polygonal bore of said cover is engaged in the said throat of the die whereby said die is held in said adapter, and an open position wherein said polygonal bore of said cover is not engaged in the said throat of the die whereby said mandrel of said die can be inserted into or removed from said adapter; and (b) spring means selected from the group consisting of compression springs and tension springs biased to maintain said cover in said closed position, said spring means being connected at one end to said adapter and at the other end to said cover.

2. The device of claim 1 further comprising a stop means to limit the rotation of said cover between said open and closed positions.

3. The device of claim 1 wherein the adapter has an inside and wherein the diaphragm cover is mounted in the adapter and said adapter contains a channel in front and on the circumference, in which the spring means is mounted, and rotation stops are arranged between the adapter and the diaphragm cover to facilitate unlocking of said die from said adapter.

4. The device of claim 1 wherein the diaphragm cover is mounted on the front periphery of the adapter, said adapter containing a series of stops and said cover containing a series of teeth, said teeth and stops being conjugate to facilitate unlocking of the die from the adapter.

5. The device of claim 1 further comprising a nut placed at the other end of the adapter to prevent the adapter from separating from the threading machine.

* * * * *